(12) United States Patent
Delanghe et al.

(10) Patent No.: US 9,771,013 B1
(45) Date of Patent: Sep. 26, 2017

(54) WRAP FOR A TRAILER BUNK

(71) Applicant: Caliber, Inc., Burnsville, MN (US)

(72) Inventors: Ernest J. Delanghe, Burnsville, MN (US); Paul Dathe, Plymouth, MN (US)

(73) Assignee: Caliber, Inc., Burnsville, MN (US)

( * ) Notice: Subject to any disclaimer, the term of this patent is extended or adjusted under 35 U.S.C. 154(b) by 261 days.

(21) Appl. No.: 14/514,746

(22) Filed: Oct. 15, 2014

Related U.S. Application Data

(60) Provisional application No. 61/891,208, filed on Oct. 15, 2013.

(51) Int. Cl.
| | |
|---|---|
| B32B 3/24 | (2006.01) |
| B60P 3/10 | (2006.01) |
| B62D 63/08 | (2006.01) |
| B32B 3/30 | (2006.01) |
| B32B 3/26 | (2006.01) |

(52) U.S. Cl.
CPC ............ B60P 3/1066 (2013.01); B32B 3/266 (2013.01); B32B 3/30 (2013.01); B62D 63/08 (2013.01); *B32B 2250/02* (2013.01); *B32B 2307/536* (2013.01); *B32B 2605/12* (2013.01)

(58) Field of Classification Search
CPC .................................................. B60P 3/1066
See application file for complete search history.

(56) References Cited

U.S. PATENT DOCUMENTS

| | | | | |
|---|---|---|---|---|
| 6,651,997 B2* | 11/2003 | Higginson | ............ | B60P 3/1066 |
| | | | | 280/414.1 |
| 2014/0377045 A1* | 12/2014 | Harms, Jr. | ............ | B60P 3/1066 |
| | | | | 414/537 |

* cited by examiner

*Primary Examiner* — William P Watkins, III
(74) *Attorney, Agent, or Firm* — Peter J. Ims; Westman, Champlin & Koehler, P.A.

(57) ABSTRACT

A sheet of polymeric material that is constructed to be coiled into a roll while in a substantially flat configuration. The sheet is positionable over a load bearing surface and at least partially around side surfaces of a bunk of a trailer. The sheet of polymeric material has at least two living hinges that are disposed along a length of the sheet and are substantially parallel to opposing side edges. The living hinges provide areas for the sheet to flex which allows the sheet of material to be manipulated about the trailer bunk. The sheet includes a top surface is configured to contact the trailer bunk where the top surface includes a plurality of ribs extending parallel to the opposing side edges and along a length of the sheet. The plurality of ribs is spaced apart and defines channels there-between that are configured to drain water from the trailer bunk.

19 Claims, 9 Drawing Sheets

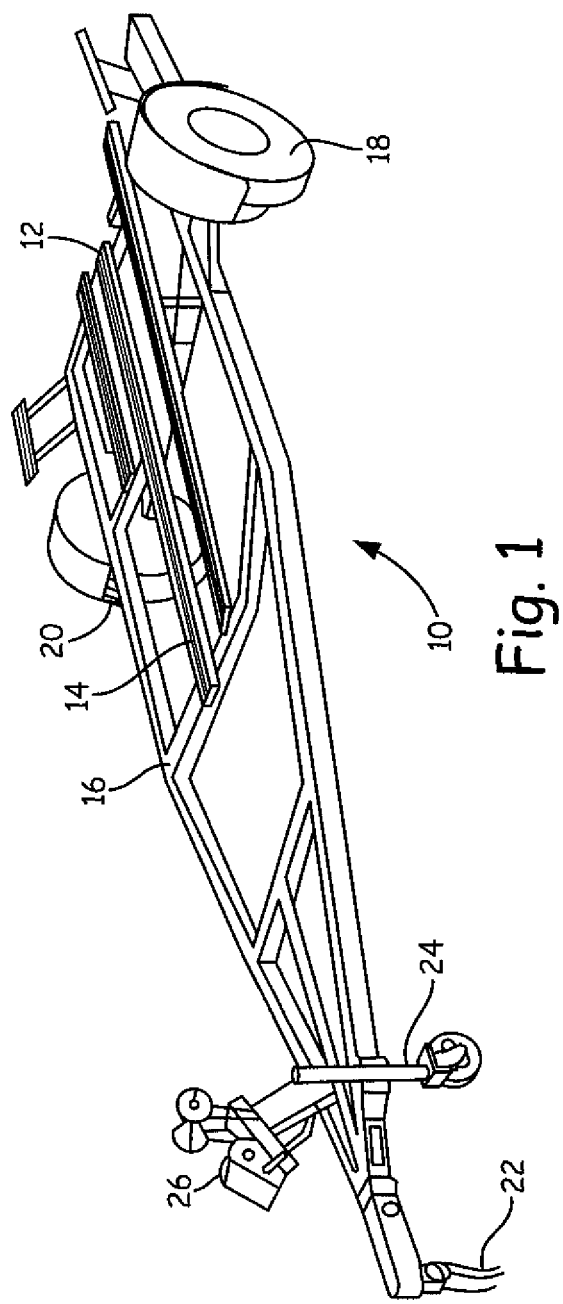

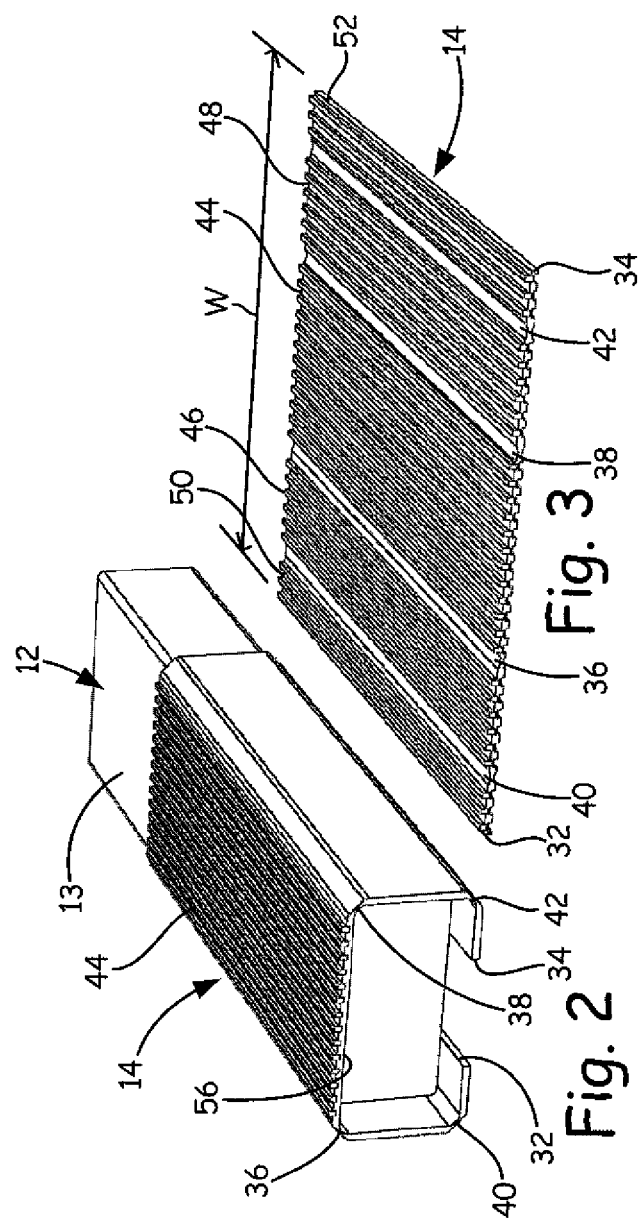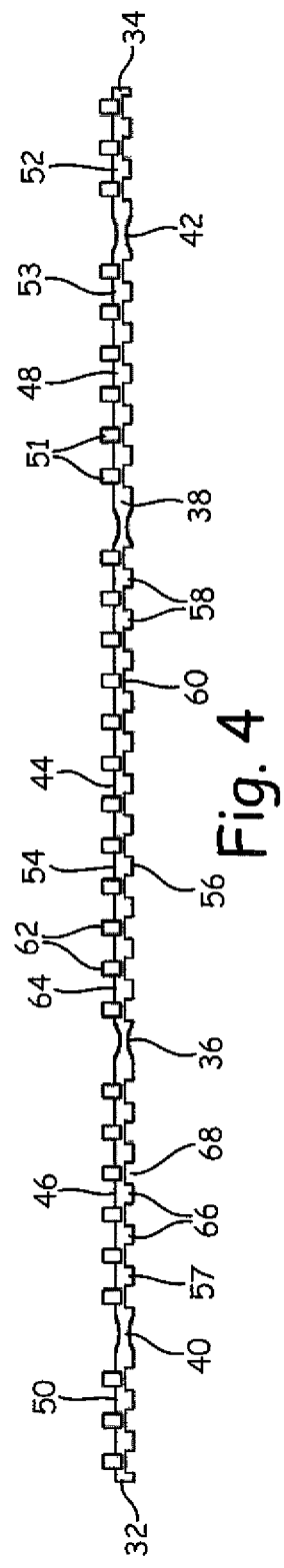

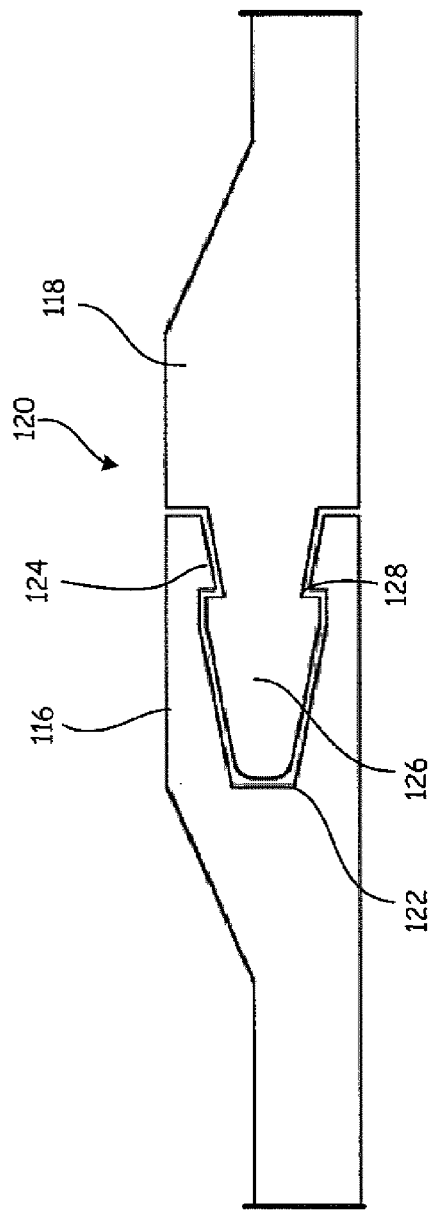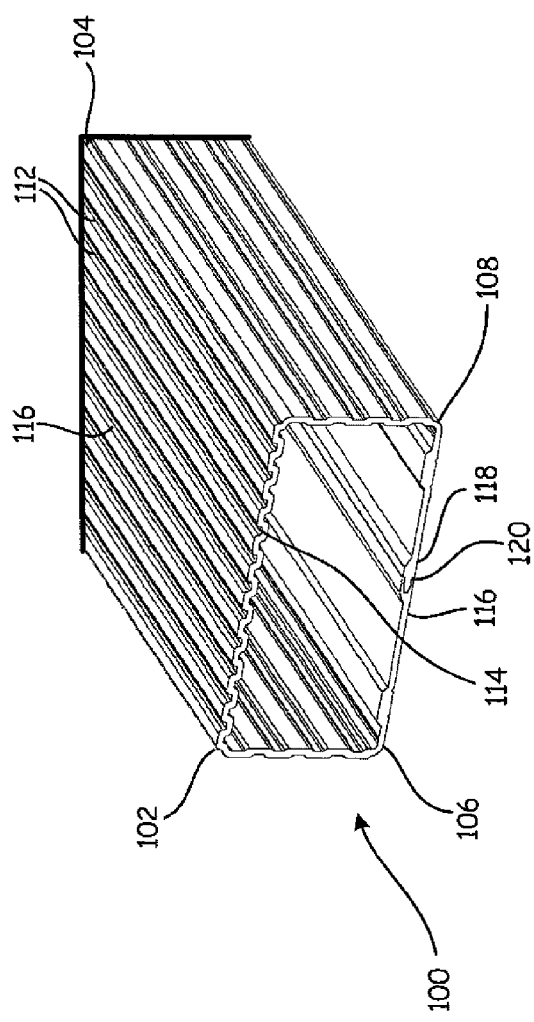

WRAP FOR A TRAILER BUNK

CROSS REFERENCE TO RELATED APPLICATION

The present application claims priority from Provisional Application Ser. No. 61/891,208 filed Oct. 15, 2013, the contents of which are incorporated by reference in its entirety.

BACKGROUND

The discussion below is merely provided for general background information and is not intended to be used as an aid in determining the scope of the claimed subject matter.

The present disclosure relates to a wrap for a trailer bunk. More particularly, the present disclosure relates to a flexible polymeric or composite wrap that is positionable about and securable over at least a load bearing or top surface of a bunk on a trailer, typically a boat trailer.

Boat trailers are utilized to transport boats or other watercraft to and from a body of water. A typical construction of a boat trailer includes two or more substantially parallel bunks that are positioned substantially orthogonal to an axle of the trailer. The bunks provide the necessary support during transport so that the boat can be moved on the trailer without damaging the hull.

A typical construction of the bunk include beams that are typically a nominal 2 inch by a nominal 4 inch in a cross section or a nominal 2 inch by a nominal 6 inch in cross section. A typical material of construction of the trailer bunk is wood. However, the bunk can be constructed from other materials of construction. A person transporting the boat may not want to have the hull in direct contact the wood bunk, as the wood may not provide sufficient cushioning and may dent the hull, especially during travel over bump roads or rough terrain. Further, the boat has a tendency to move, at least slightly, in back and forth motion that is transverse to the longitudinal axis of the wood bunk during transit. Therefore direct contact of the hull with the exposed wood bunk has the potential to scratch or otherwise damage the finish or paint of the hull.

In order to minimize the damage that can be incurred by the boat hull during transit, carpeting is typically placed around at least the load bearing surfaces of the bunk. The carpeting provides cushioning and rounds the sharp corner edges of the bunk, which reduces the risk that the boat hull will be damaged by denting or scraping during transit.

However, the use of carpet also has detrimental effects on the boat hull, especially boat hulls that are made out of aluminum. When the carpet is wet, the carpet has a tendency of creating an electrolysis effect which causes the aluminum to breakdown. Further, the carpet typically has a tendency to rip which can lead to hull damage. The cushioning effect of the carpet can also be negated by wear and tear through use over time. Finally, carpeting allows for the migration of invasive species of one body to another as the carpet can retain these invasive species within the pile of the carpet. Such invasive species include, but are not limited to, Eurasian milfoil and zebra mussels.

SUMMARY

This Summary herein is provided to introduce a selection of concepts in a simplified form that are further described below in the Detailed Description. This Summary is not intended to identify key features or essential features of the claimed subject matter, nor are they intended to be used as an aid in determining the scope of the claimed subject matter. The claimed subject matter is not limited to implementations that solve any or all disadvantages noted in the Background.

The present disclosure includes a sheet or web of polymeric material that is capable of being coiled into a roll while in a substantially flat configuration. The sheet has a selected width to be positioned over an upper or load bearing surface and at least partially around side surfaces of a bunk of a trailer such that the wrap seamlessly covers the bunk. The sheet of polymeric material has at least two living hinges that are disposed along a length of the sheet and are substantially parallel to opposing side edges. The living hinges provide areas for the sheet to flex which allows the sheet of material to be manipulated about the surfaces of a nominal 2"×4" or a nominal 2"×6" cross-sectional trailer bunk. The sheet includes a top surface and a bottom surface where the bottom surface is configured to contact the trailer bunk. The top surface includes a plurality of ribs extending parallel to the opposing side edges and along a length of the sheet. The plurality of ribs are configured to engage the hull of the boat. The plurality of ribs is spaced apart and defines channels there-between that are configured to drain water from the trailer bunk and therefore prevent the transfer of invasive species. The polymeric material includes a plurality of apertures at least proximate the opposing side edges that are configured to accept a securing mechanism for retaining the sheet of material to the bunk.

The present disclosure also includes a method of installing a wrap on a bunk of a boat trailer. The method includes providing a roll of polymeric material that is substantially flat when retained in a coil. A length of the coil is uncoiled where the length is typically approximately a length of the trailer bunk. At the selected location which is approximately a length of a bunk, the material is scored to form a score line in the material from a first side edge to a second side edge. Manual force is then placed on each side of the score line which causes the material to break along the score line. The material is then positioned along the length of the bunk and covers the upper surface and at least a portion of opposing side surfaces of the bunk. The material is secured to the bunk utilizing a securing mechanism or a plurality of securing mechanisms such that at least an upper or load bearing surface of the bunk is covered by the material and the wrap seamlessly covers the bunk.

BRIEF DESCRIPTION OF THE DRAWINGS

FIG. 1 includes a perspective view of a boat trailer having a bunk wrap of the present disclosure secured around the trailer bunks.

FIG. 2 is a perspective view of the bunk wrap material partially covering a bunk.

FIG. 3 is a perspective view of a portion of the bunk wrap material in a flat configuration.

FIG. 4 is an edge view of the bunk wrap material illustrated in FIG. 3.

FIG. 9 is a perspective view of another bunk wrap having a lap joint formed in opposing side edges.

FIG. 10 is an enlarged view of the lap joint.

DETAILED DESCRIPTION OF ILLUSTRATIVE EMBODIMENTS

Figure 5:
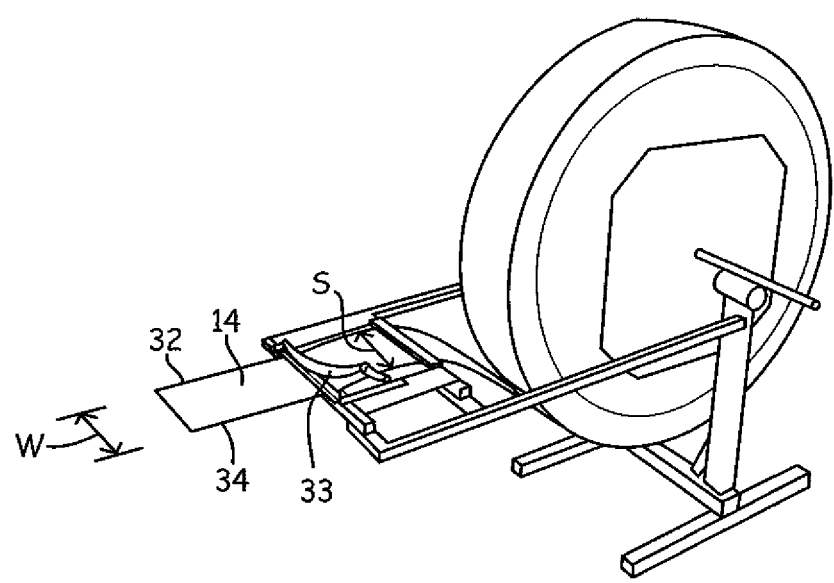
FIG. 5 is a perspective view of the bunk wrap material in a roll.
Figure 6:
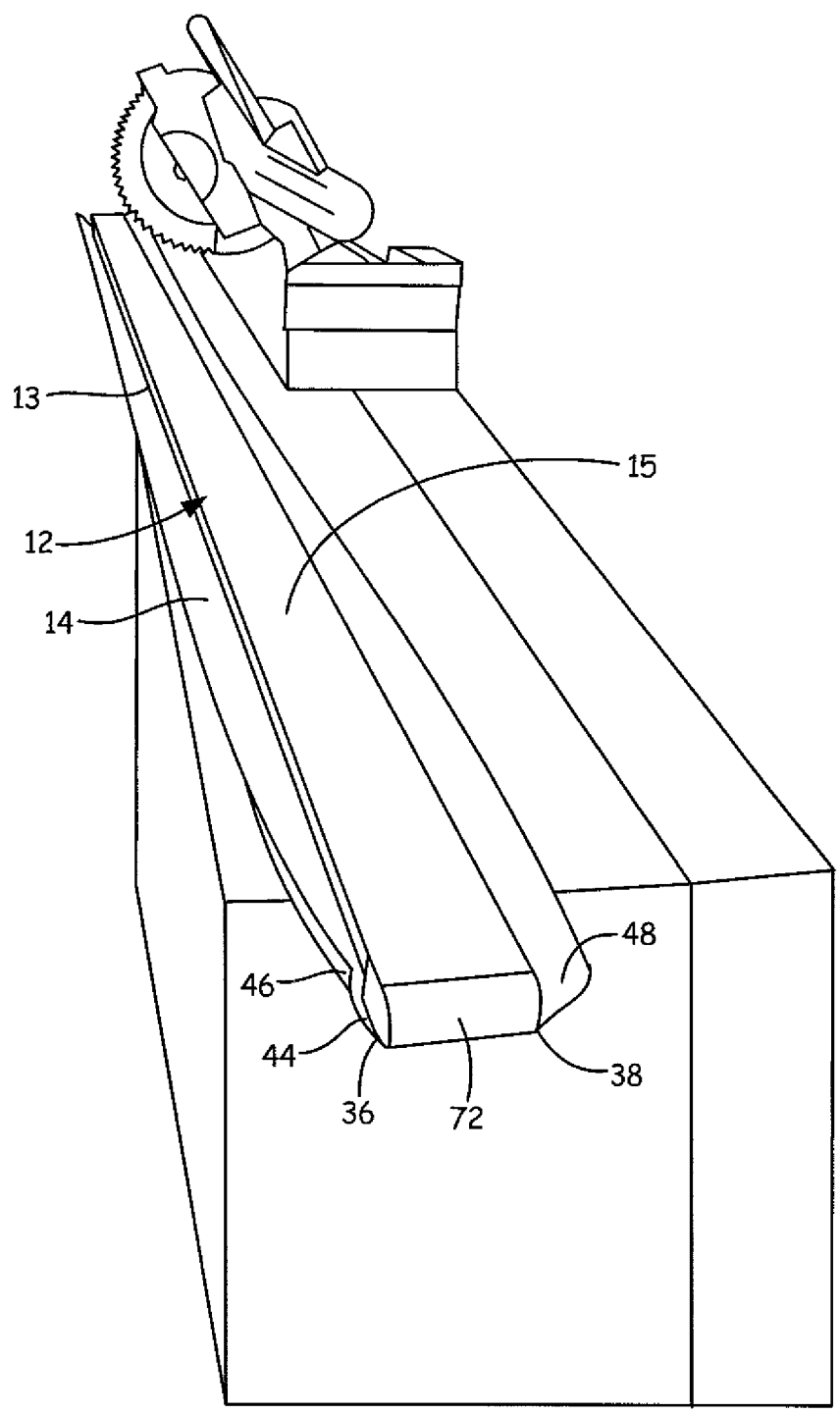
FIG. 6 is a perspective view of the bunk wrap material partially installed on a bunk.
Figure 8:
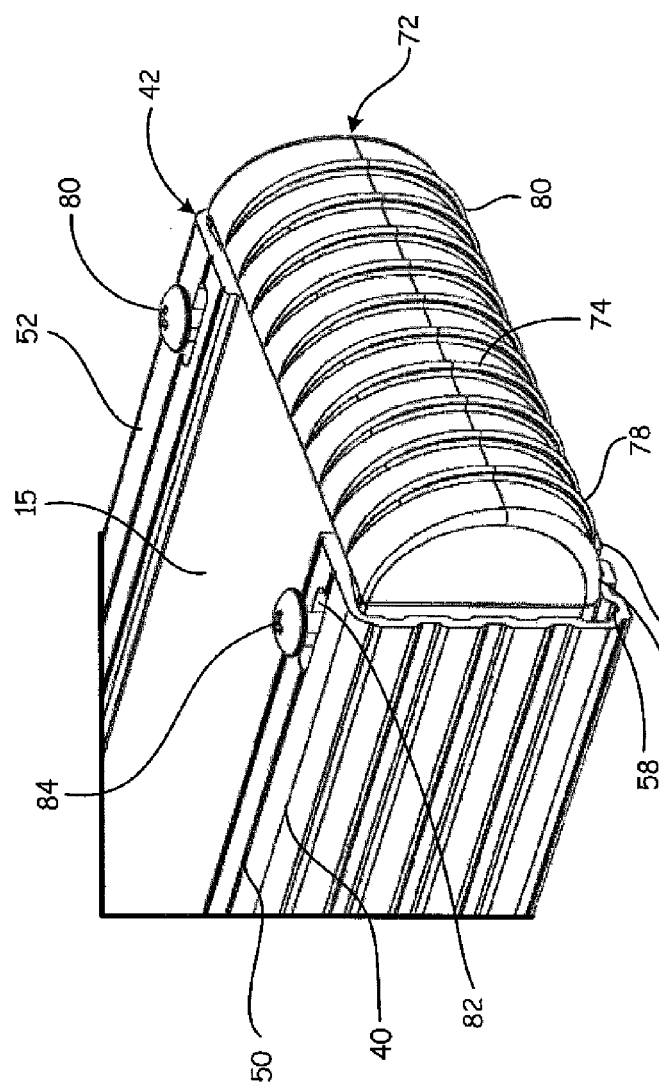
FIG. 8 is a perspective view of an end of the bunk with the bunk wrap material and the end cap installed.
Figure 7:
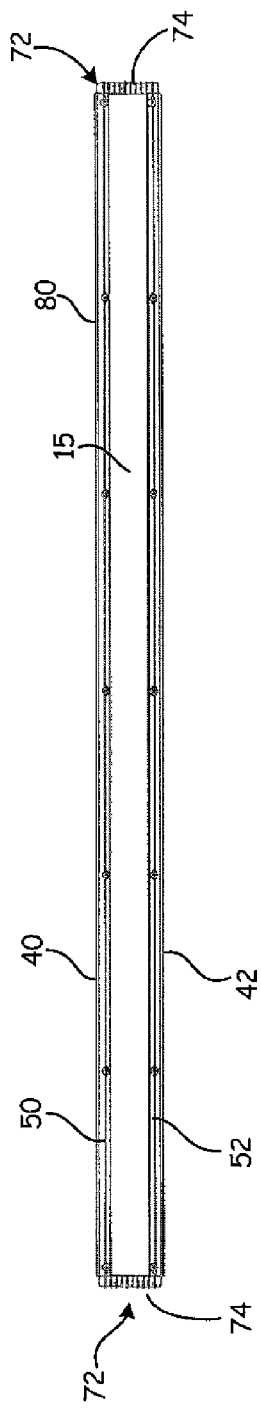
FIG. 7 is a bottom view of a bunk with the bunk wrap installed along with end caps secured to ends of the bunk.

A boat trailer 10 having a wrap 14 positioned around each bunk 12 of the trailer is generally illustrated in FIG. 1. The trailer 10 includes a frame 16 that supports the bunks 12. The trailer 10 includes at least left and right wheels 18 and 20, respectively. A front end of the trailer includes a hitch 22 for securing the trailer 10 to a vehicle along with a jack 24 for maintaining a front end of the trailer 10 at a selected height when detached from the vehicle. The trailer 10 includes a winch 26 for engaging a front end of a boat (not shown) with a rope or cable and where the winch 26 is utilized to pull the boat (not shown) onto the bunks 14 of the boat trailer 10.

Referring to FIGS. 2-4, the wrap 14 is constructed from a polymeric material through a molding or extrusion process to form a sheet or web. The wrap 14 includes left and right side edges 32 and 34 that define a width W of the wrap 14. The wrap 14 includes living hinges 36, 38, 40 and 42 that are spaced apart to be positioned about the corner edges of the bunk 12 wherein the living hinges 36, 38, 40 and 42 are substantially parallel to each other and the side edge 32 and 34. The living hinges 36, 38, 40 and 42 can be spaced apart to engage the corner edges of any cross-sectional dimensioned bunk 12, where typical cross sectional dimensions are a nominal 2 inches by a nominal 4 inches or a nominal 2 inches by a nominal 6 inches. While the wrap 14 is discussed in the context of a trailer bunk, the wrap 14 can be configured to be secured to any surface of a support member besides that of a trailer bunk 12. The wrap 14 therefore provides a seamless cover from one end to the other end of the bunk 12.

The wrap 14 includes a middle portion 44 and left and right intermediate portions 46 and 48 that are joined to the middle portion 44 by the living hinges 36 and 38, respectively. The wrap 14 also includes a left edge portion 50 that is joined to the left intermediate portion 46 with the living hinge 40 and a right edge portion 52 that is joined to the right intermediate portion 48 with the living hinge 42.

A top surface 54 of the middle portion 44 of the wrap 14 is configured to engage a hull of a boat (not shown) and a bottom surface 56 of the middle portion 44 is configured to engage a load bearing surface 13 of the bunk 14. As illustrated in FIG. 2, the bottom surface 56 can optionally be substantially flat. As illustrated in FIGS. 3 and 4, the bottom surface 56 can include a plurality of spaced part ribs 58 that define channels 60 there-between. The spaced apart ribs 58 are configured to engage the surfaces of the bunk 12 and the channels 60 provide passages for water to exit from between the bottom surface 56 and the bunk 14.

The top surface 54 of the middle portion 44 includes a plurality of raised ribs 62 that define channels 64 therebetween. The raised ribs 62 are configured to engage the hull of the boat (not shown). The channels 64 are configured to drain water from between the hull of the boat and the top surface 54 of the wrap 14. While the top surface 54 with raised ribs 62 and the channels 64 are illustrated, it is also contemplated that the top surface 54 of the middle portion 44 could be substantially smooth or have other surface configurations.

The left and right intermediate portions 46 and 48 and the left and right edge portions 50 and 52 are illustrated with raised ribs 51 that define channels 53 therebetween. However, it is also contemplated that the left and right intermediate portions 46 and 48 and the left and right edge portions 50 and 52 be substantially flat, as illustrated in FIG. 2.

As illustrated, the left intermediate portion 46, the right intermediate portion 48, the left edge portion 50 and the right edge portion 52 include raised ribs 66 and channels 68 on the bottom surfaces 57. The raised ribs 66 and channels 68 aid in removing water and moisture from between the wrap 14 and the bunk 12 which aids in preserving the integrity of the bunk 12. However, it is within the scope of the present disclosure that the bottom surface 57 of the right intermediate portion 48, the left edge portion 50 and the right edge portion 52 be substantially flat as illustrated in FIG. 2.

The living hinges 36, 38, 40 and 42 are located at selected spaced apart distances to allow the wrap 14 to be positioned about the outer surfaces of the bunk 12. As illustrated the living hinges 36, 38, 40 and 42 are located to engage edge corners of a rectangular cross-sectional bunk 12, such as a nominal two inch by a nominal four inch or a nominal two inch by a nominal six inch rectangular cross-sectional wood board. However, the number and location of the living hinges can be adjusted to allow the wrap to be positioned about an outer surface of any support member.

Referring to FIG. 5, the wrap 14 is sufficient flexible to be wound into a roll 70 with the wrap 14 in a substantially flat configuration. The capability of wrap 14 to be substantially flat and sufficiently flexible to be wound into the roll 70 provides significant benefits over rigid wraps. These advantages include, but not limited to, less space being required for transit for the same lineal feet of wrap relative to rigid wraps. Also the flexible wrap 14 allows for a desired length of the wrap 14 to be cut relative to a rigid wrap having a pre-determined length such that waste is minimized.

Referring to FIGS. 5-8, the wrap 14 is secured to the bunk 12 by first measuring a length of the bunk 12. Once the length of the bunk has been determined, either an end cap 72 is installed at one or both ends of the bunk 12 or a sufficient length of the wrap 14 is accounted for to allow the wrap 14 to be secured at the front and back ends of the bunk 12 by folding the wrap 14 over the ends of the bunk 12. Both end caps 72 include a rounded end 74 and an upper surface 76 that has a plurality of ribs 78 that define channels 80. The upper surface 76 of the end cap 70 is complimentary to the bottom surface 56 of the middle portion 44 such that the plurality of spaced part ribs 58 extending from the bottom surface 56 nest within the channels 80 in the upper surface of the end cap 70 and the channels 60 in the bottom surface 56 of the middle portion 44 accept the ribs 78 in the upper surface 76 of the end cap 70.

The wrap 14 is then measured to the selected length, scored with a line S across the width W from the left side edges 32 to the right side edge 34 in the transverse direction and then broken along the score line S using a force, such as manual force. Utilizing the score line S and manual force provides a cleaner or smoother end surface and causes less waste relative to cutting the material with a saw.

A sheer cutter 33 can also be used to cut the wrap 14 across the width where the edge made by pivoting the cover about a pivot pin such that a blade on the cutter perpendicular to the top and bottom surfaces. The shear cutter 33 is forced downward such that the blade of the cutter 33 engages the top surface or bottom surface of the bunk with a perpendicular force. The use of the cutter 33 results in a smooth surfaces that has substantially no burs or other defects. However, it is also contemplated that a saw can be utilized to cut the wrap 14 in the transverse direction.

The wrap 14 is then positioned along the length of the bunk 12 such that the middle portion 44 is adjacent the load bearing or hull engaging surface 13 of the bunk 12 along an entire length of the bunk 12 such that the wrap seamlessly covers the load bearing surface 13 of the bunk 12. Conversely the bunk 12 can be removed from the trailer 10 and the bunk 12 can be positioned on the wrap 14 such that the load bearing surface or hull engaging surface 13 of the bunk 12 is adjacent the middle portion 44 of the wrap 14.

A force, such as manual force, is applied to the left and right intermediate portions 46 and 48 such that living hinges 36 and 38, respectively, flex along the upper edge corners of the bunk 12 such that the intermediate portions 46 and 48 are proximate side surfaces of the bunk 12. Force is then placed upon the left and right edge portion 50 and 52 such that the living hinges 40 and 42 flex along the bottom edge corners of the bunk 12 such that the left and right edge portions 50 and 52 are positioned proximate a bottom surface 15 of the bunk 12 and the left and right edge portions 50 and 52 both partially cover a portion of the bottom surface 15.

The wrap 14 is secured to the bunk 12 utilizing screws 80 that are positioned within spaced apart elongated slots 82 within the left and right edge portions 50 and 52 and proximate the left and right edge 32 and 34, all respectively. The screws 80 are embedded into the bunk 12 such that heads 84 of the screws 80 are spaced from and do not frictionally engage the wrap 14, which allows the wrap 14 to expand and contract as the wrap 14 is heated or cooled due to ambient conditions. Allowing the expansion and contraction and/or movement of the wrap 14 prevents the wrap 14 from buckling and/or warping over time. While the heads 84 of the screws 80 can be spaced from the left and right edge portions 50 and 52, it is also contemplated that the heads 84 of the screws 80 can frictionally engage the left and right edge portions 50 and 52 to fixedly retain the wrap 14 to the bunk 12.

As the bottom surface 15 of the bunk 12 is not a load bearing or hull contacting surface, the screws 82 positioned through the elongated slots 82 in the left and right edge portions 52 and 54 can be utilized to retain the wrap 14 to the bunk without causing any damage to the hull of a boat. While screws 80 are described and illustrated, other securing mechanisms can also be utilized to retain the wrap 14 to the bunk 12 including but not limited to nails, glue, adhesive and/or cement.

After securing the wrap 14 to the bunk 12 and optionally the end caps 70 to the ends of the bunk 12, the bunk 12 can be reinstalled onto the trailer or is ready for use if the bunk 12 is not removed from the trailer 10. It is contemplated that each bunk 12 on the trailer be equipped with the wrap 14 and optionally the end caps 70 to protect the hull of the boat from damage during loading, transit and unloading.

While a wrap 14 with four living hinges 36, 38, 40 and 42 is illustrated, it is also within the scope of the present disclosure to utilize a wrap 14 two living hinges 36 and 38 wherein the wrap 14 is secured to vertical side surfaces of then bunk 12 such that the load bearing or upper surface 13 of the bunk 12 is covered by the wrap 14.

Referring to FIGS. 9 and 10, a wrap 100 is illustrated wherein the wrap 100 has a similar construction to the wrap 14 with four living hinges 102, 104, 106 and 108 and with the plurality of ribs 110 defining channels 112 in an upper surface 114. Left and right edges 116 and 118 are positioned near each other such that they can be interconnected using an interlocking mechanism 120. The interlocking mechanism 120 for the left and right edges 116 and 118 includes a cavity 122 having a constricted entrance 124 into which a locking member 126 having a complimentary configuration is inserted such that a shoulder 128 engages the constricted entrance 124 to retain the locking member 126 therein.

Figure 11:
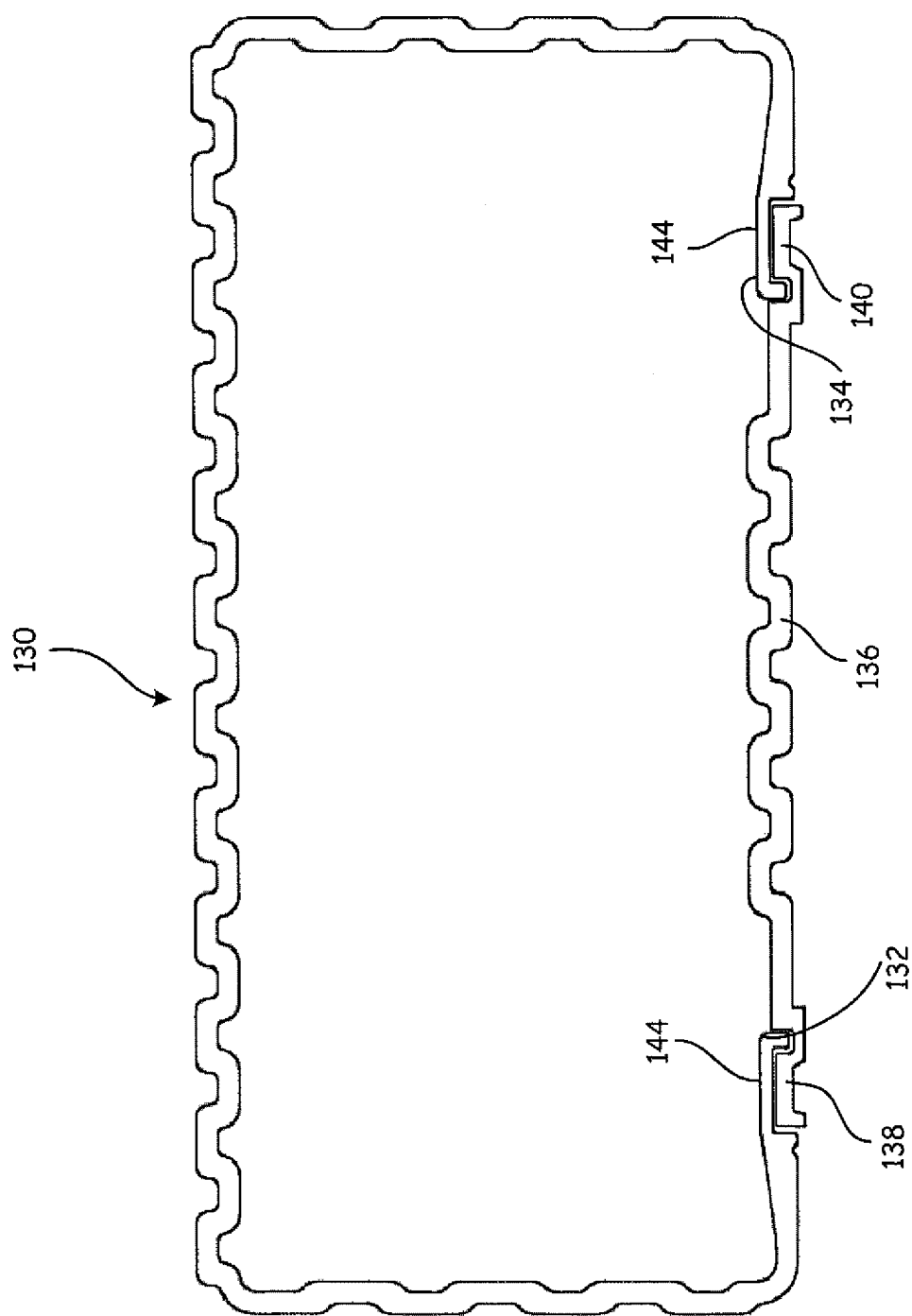
FIG. 11 is a perspective view of another bunk wrap having opposing side edges secured together with a bottom connecting member.

Alternatively, referring to FIG. 11, a similar wrap 130 is illustrated to that of the wrap 100. Instead of locking the left and right edges 116 and 118 together with the interlocking mechanism 120, the wrap 130 is configured such that there is a gap between the left and right edges 132 and 134, where the left and right edges 132 and 134 are joined utilizing a separate locking member 136 where the separate locking member 136 includes interlocking joint members 138 and 140 that interlock with the complimentary left and right joint members 142 and 144 proximate the left and right edges 132 and 134, respectively.

With either the left or right edges 116 and 118 interlocking, utilizing a separate locking member 136 with the left and right edges 132 and 134 or securing the edge portions 50 and 52 with screws 80, the wraps 14, 100 and 134 are secured around the surface of the bunk 12 and protect the hull of a boat and also prevent the introduction of invasive species, such as, but not limited to Eurasian milfoil, to be carried from one body of water to another body of water. Further, because the wraps 14, 100 and 130 are constructed of a polymeric material, the wrap prevents electrolysis breakdown of the aluminum hulls of boats that can occur with the utilization of a carpet wrap. With the wrap 14, 100 or 130 secured around the bunk 12, the wrap 14, 100 or 130 provides protection to the boat hull and increases the ability of the boat to slide onto the bunk 12 relative to an uncovered bunk 12 or a bunk 12 covered with carpet and also prevents the migration of invasive species from one body of water to another.

Figure 12:
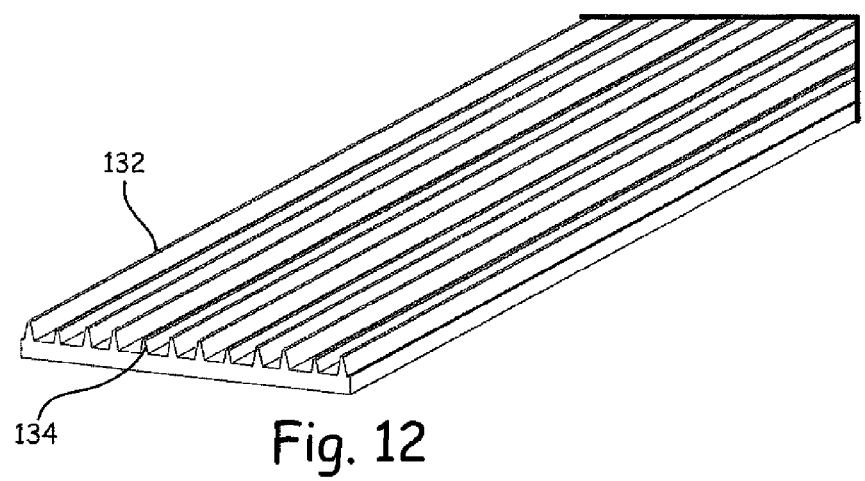
FIG. 12 is a perspective view of an embodiment having ribs with different height levels.

As illustrated in FIGS. 1-11, the wraps 14, 100 and 130 can be extruded from a single material having different mechanical properties in the transverse direction of the warp 14, 100 and 130. Further, the wraps 14, 100 and 130 can be manufactured with the plurality of ribs having a uniform height. Alternatively, referring to FIG. 12, the ribs 132 and 134 can have different heights.

Figure 13:
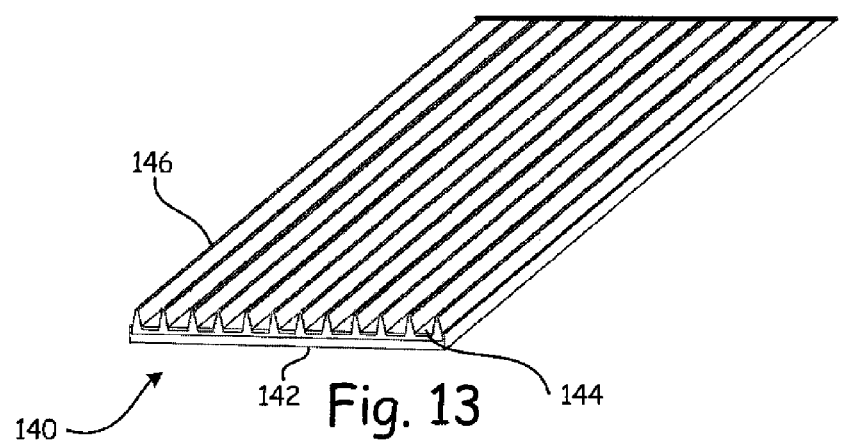
FIG. 13 is a perspective view of a co-extruded bunk wrap having ribs having the same height.

Referring to FIG. 13, a wrap 140 is illustrated that has a similar construction to that of the wrap 14 where the wrap 140 has ribs 146 of a uniform height. The wrap 140 has a more rigid base layer 142 being coextruded with a polymer layer 144 having cushioning or flexible properties on the load bearing surfaces. The polymer layer 144 aids in retaining the boat on the trailer 10 while minimizing the risk of damage during loading, unloading and transit.

Figure 14:
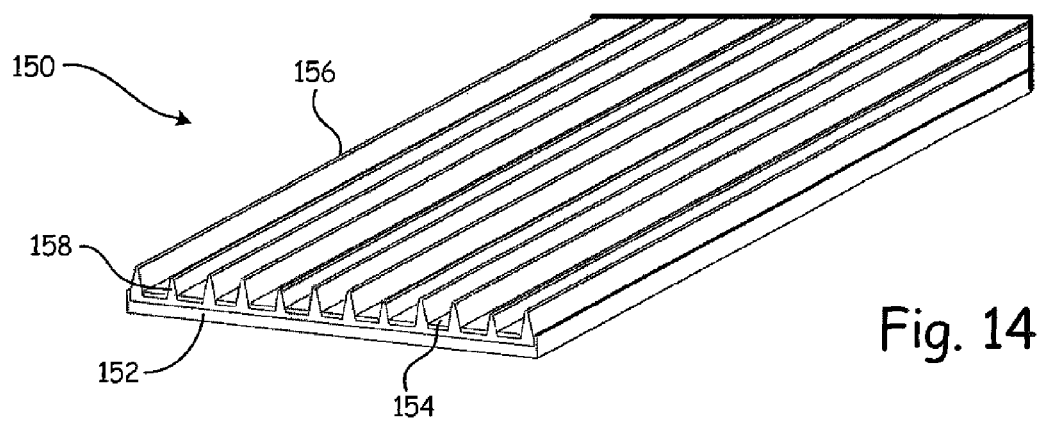
FIG. 14 is a perspective view of a co-extruded bunk wrap having ribs having different height levels.

Referring to FIG. 14, a wrap 150 is illustrated where the wrap is coextruded with a rigid base layer 152 and a flexible load bearing layer 154. The wrap 150 includes ribs 156 and 158 of different heights similar to the wrap 140 illustrated in FIG. 13.

Figure 15:
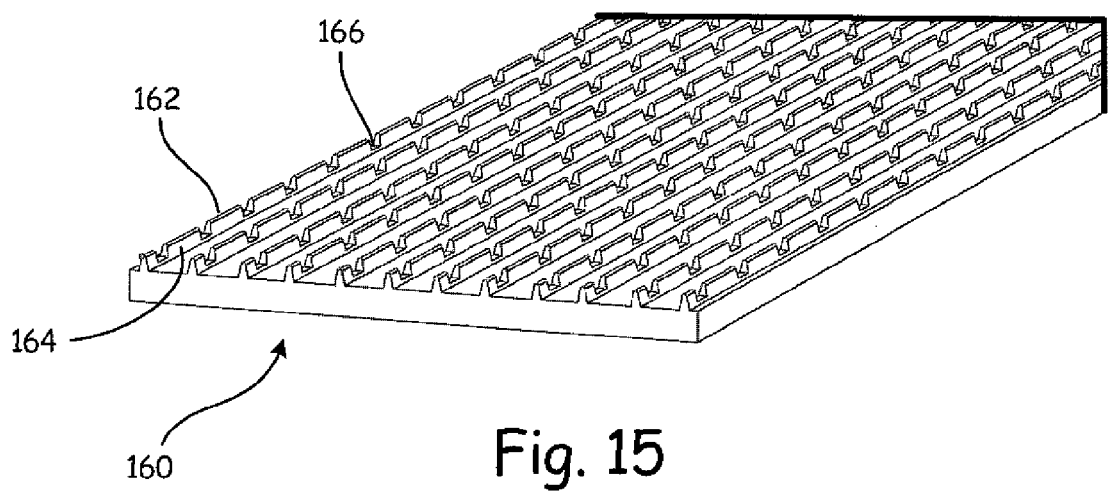
FIG. 15 is a perspective view of a bunk wrap having interruptions in the ribs.

Typically, the ribs of the wraps have a substantially uninterrupted top surface. Alternatively, referring to FIG. 15 an extruded wrap 160 of a single material is illustrated where top surfaces 162 of the ribs 164 include cut out portions 166. The cutout portions 166 allow for further clean out of debris from between the ribs 82. The ribs 164 can have a uniform height as illustrated or differing heights.

Figure 16:
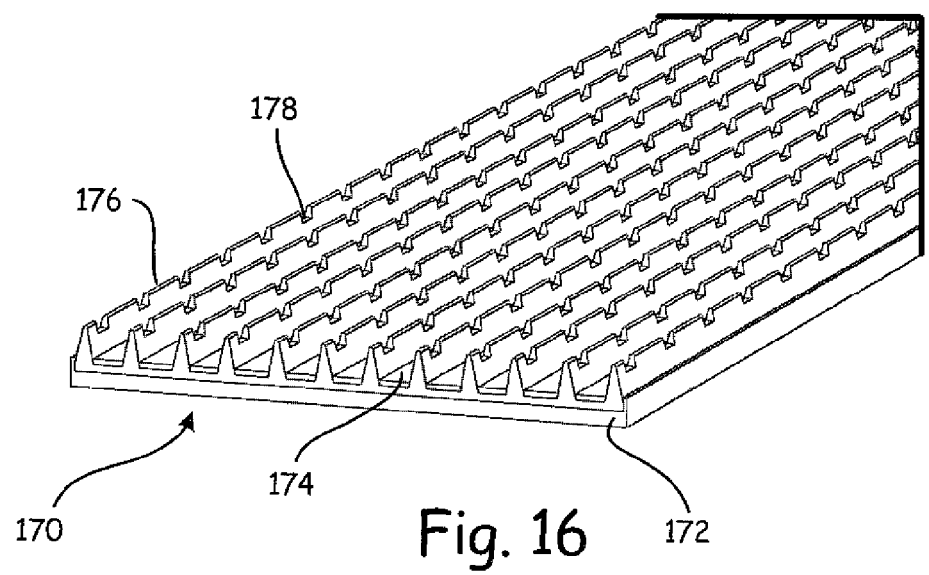
FIG. 16 is a perspective view of a bunk wrap that is co-extruded having interruptions in the ribs.

Referring to FIG. 16, a wrap 170 is illustrated where the wrap is similar to that of the wrap 160, but the wrap 170 is coextruded with a rigid base layer 172 and a more flexible load bearing layer 174. Ribs 176 of the wrap 170 have cut out portions 178 in a top surface 180 that aid in removing debris from the wrap 170.

The polymeric material can include low friction properties that reduce the friction load by up to about 300% relative to a conventional bunk to aid in loading the boat onto the trailer. Further, elements of one embodiment can be utilized with elements of the other embodiments of the disclosed wraps such as the different securing mechanism, the configurations of the ribs including the heights and cut out portions and also whether the wrap is of a uniform construction or a composite construction, such as though a coextrusion process.

Although the present invention has been described with reference to preferred embodiments, workers skilled in the art will recognize that changes may be made in form and detail without departing from the spirit and scope of the invention.

What is claimed is:

1. A polymeric wrap configured to be attached to a bunk having a substantially rectangular configuration having a top, load bearing surface between first and second corner edges, a bottom surface between third and fourth corner edges where the bottom surface is substantially parallel to the top, load bearing surface, a left side surface connecting the first and third corner edges and a right side surface connecting the second and fourth corner edges, the wrap comprising:
   a main portion having a first edge and a second edge;
   a first intermediate portion connected to the first edge of the main portion with a first living hinge;
   a second intermediate portion connected to the second edge of the main portion with a second living hinge wherein the main portion has a length a width to cover the load bearing surface of the bunk;
   a first end portion connected to the first intermediate portion with a third living hinge, wherein the first end portion is configured to engage the bottom surface of the bunk; and
   a second end portion connected to the second intermediate portion with a fourth living hinge, the second end portion is configured to engage the bottom surface of the bunk, wherein the first living hinge, the second living hinge, the third living hinge and the fourth living hinge are located on the polymeric wrap such that the first living hinge, the second living hinge, the third living hinge and the fourth living hinge are configured to engage the first, second, third and fourth corner edges, respectively, of the bunk.

2. The polymeric wrap of claim 1 and wherein the main portion comprises:
   a top surface comprising a plurality of spaced apart upwardly extending ribs wherein the plurality of ribs is substantially parallel to the first and second living hinges; and
   a plurality of channels between the plurality of spaced apart upwardly extending ribs.

3. The polymeric wrap of claim 1 and wherein first end portion and the second end portion each comprises a plurality of spaced apart apertures configured to accept a securing mechanism.

4. The polymeric wrap of claim 3 and wherein the plurality of spaced apart apertures comprises elongated slots.

5. The polymeric wrap of claim 1 and wherein the main portion comprises:
   a bottom surface configured to engage the top, load bearing surface of the bunk, the bottom surface comprising a plurality of spaced apart downwardly extending ribs wherein the plurality of ribs are substantially parallel to the first and second living hinges; and
   a plurality of channels between the plurality of spaced apart downwardly extending ribs.

6. The polymeric wrap of claim 2 and wherein each of the plurality of ribs comprises a substantially smooth top surface.

7. The polymeric wrap of claim 2 and wherein each of the plurality of ribs comprises a top surface interrupted with cutouts.

8. The polymeric wrap of claim 2 and wherein the plurality of ribs comprises at least two ribs of different heights.

9. The polymeric wrap of claim 2 and further comprising:
   a base layer constructed of a first material and having an upper surface and a lower surface wherein the lower surface is configured to engage the bunk; and
   an upper layer secured to the upper surface of the base layer wherein the upper layer is constructed from a second material that is softer than the first material.

10. The polymeric wrap of claim 9 and wherein each of the plurality of ribs comprises a substantially smooth top surface wherein the top surface of the ribs is a portion of the upper layer.

11. The polymeric wrap of claim 9 and wherein each of the plurality of ribs comprises a top surface interrupted with cutouts wherein the top surface of the ribs is a portion of the upper layer.

12. The polymeric wrap of claim 9 and wherein the plurality of ribs comprises at least two ribs of different heights wherein the top surface of the ribs is a portion of the upper layer.

13. A method of securing a polymeric wrap to a bunk having a load bearing surface and a rectangular cross section, the method comprising:
   providing a web of the polymeric wrap in a coil wherein the coiled web is substantially flat wherein the web includes a main portion, first and second intermediate portions and first and second end portions wherein the main portion is connected to the first intermediate portion with a first living hinge, the main portion is connected to the second intermediate portion with a second living hinge, the first intermediate portion is connected to the first end portion with a third living hinge and the second intermediate portion is connected to the second end portion with a second living hinge;
   measuring a length of the bunk;
   uncoiling a length of the web;
   placing a line on the web at approximately the length of the bunk;
   displacing the length of the web from the coil such that the length has a proximal end and a distal end;
   placing the load bearing surface of the bunk on a bottom surface of the main portion;

placing force on the first and second intermediate portions to cause the first and second living hinges to flex such that the first and second intermediate portions are proximate side surfaces of the bunk;

placing force on the first and second end portions to cause the third and fourth living hinges to flex such that the first and second end portions are adjacent an opposing surface to the load bearing surface; and securing the first and second end portions to the opposing surface to retain the wrap to the bunk.

14. The method of claim 13 and wherein placing a line on the web at approximately the length of the bunk comprising scoring a line into the web from a first side edge to a second side edge.

15. The method of claim 14 and wherein displacing the length of the web from the coil comprises placing forces on opposing sides of the score line to cause the web to break at the score line.

16. The method of claim 13 and wherein securing the first and second end portions to the opposing surface to retain the wrap to the bunk comprises positioning screws through apertures in the first and second end portions and into the bunk.

17. The method of claim 13 wherein the wrap is positioned about the bunk, the wrap provides a seamless cover on the bunk.

18. The method of claim 13 and further comprising:
securing end caps to ends of the bunk wherein the end caps comprises a rounded end surface and an upper portion that engages the load bearing surface.

19. The method of claim 13 and wherein the length is displaced from the roll with a shear cutter.

* * * * *